(12) United States Patent
Henrick et al.

(10) Patent No.: US 10,171,385 B1
(45) Date of Patent: Jan. 1, 2019

(54) DYNAMICALLY PROVIDING SYSTEM COMMUNICATIONS IN A VIRTUAL SPACE TAILORED TO INDIVIDUAL USERS RESPONSIVE TO SPECIFIC USER ACTIONS AND INDIVIDUAL CURRENT STATES

(71) Applicant: KABAM, INC., San Francisco, CA (US)

(72) Inventors: Clive Henrick, Castro Valley, CA (US); Benjamin Yee, San Francisco, CA (US); Moses Lee, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 116 days.

(21) Appl. No.: 14/531,768

(22) Filed: Nov. 3, 2014

Related U.S. Application Data

(63) Continuation of application No. 13/526,208, filed on Jun. 18, 2012, now Pat. No. 8,880,629.

(51) Int. Cl.
*G06F 15/16* (2006.01)
*H04L 12/58* (2006.01)
(Continued)

(52) U.S. Cl.
CPC ......... *H04L 51/04* (2013.01); *G06Q 30/0277* (2013.01); *H04L 67/38* (2013.01)

(58) Field of Classification Search
CPC ......... H04L 67/38; H04L 51/04; H04L 67/22; G06Q 30/0251–30/0255; G06Q 30/0277; G06Q 30/0259–30/0261
(Continued)

(56) References Cited

U.S. PATENT DOCUMENTS

| | | | |
|---|---|---|---|
| 6,302,793 B1 | 10/2001 | Fertitta, III et al. | 463/25 |
| 6,560,636 B2 * | 5/2003 | Cohen | H04L 29/06 709/201 |

(Continued)

OTHER PUBLICATIONS

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

(Continued)

*Primary Examiner* — Lance Leonard Barry
(74) *Attorney, Agent, or Firm* — Sheppard Mullin Richter & Hampton LLP (57) ABSTRACT

System communications tailored to individual users may be dynamically provided responsive to trigger events in a virtual space. System communications may be sent if (1) triggered by trigger events in the virtual space, and (2) selected based on user state that is separate and discrete from the trigger events. Trigger events may include specific user actions, such as registering as a user in the virtual space. Current states may be obtained responsive to trigger events occurring. A given current state may include (1) a frequency of engagement by the first user in the virtual space, (2) an amount of real-world money spent toward the virtual space, and/or (3) total time spent by a user while engaged in gameplay in the virtual space. An individual system communication is selected and provided for presentation to a user responsive to an individual current state corresponding to the individual system communication.

16 Claims, 4 Drawing Sheets

(51) Int. Cl.
*H04L 29/06* (2006.01)
*G06Q 30/02* (2012.01)

(58) Field of Classification Search
USPC ............... 705/14.49–14.67; 463/42; 709/206
See application file for complete search history.

(56) References Cited

U.S. PATENT DOCUMENTS

| | | | | |
|---|---|---|---|---|
| 6,884,172 | B1* | 4/2005 | Lloyd | A63F 13/12 463/40 |
| 6,928,474 | B2 | 8/2005 | Venkatesan | 709/224 |
| 7,076,453 | B2 | 7/2006 | Jammes et al. | 705/26 |
| 7,143,054 | B2 | 11/2006 | Doherty | 705/10 |
| 7,533,336 | B2 | 5/2009 | Jaffe et al. | 715/243 |
| 7,640,300 | B2* | 12/2009 | Wohlgemuth | H04L 63/0209 455/416 |
| 7,660,740 | B2 | 2/2010 | Boone et al. | 705/26 |
| 7,941,339 | B2 | 5/2011 | Argaiz | 705/14.49 |
| 8,010,657 | B2 | 8/2011 | Hall et al. | 709/224 |
| 8,036,930 | B2 | 10/2011 | Brignull et al. | 705/7.33 |
| 8,105,167 | B2* | 1/2012 | Mori | A63F 13/12 463/20 |
| 8,140,376 | B2 | 3/2012 | Koonce et al. | 705/7.29 |
| 8,182,346 | B2 | 5/2012 | Herrmann et al. | 463/42 |
| 8,226,472 | B2* | 7/2012 | Van Luchene | A63F 13/10 463/25 |
| 8,454,441 | B2* | 6/2013 | Auterio | A63F 13/12 463/42 |
| 8,560,387 | B2* | 10/2013 | Amidon | G06Q 10/10 705/14.4 |
| 8,880,629 | B1* | 11/2014 | Henrick et al. | 709/206 |
| 9,098,387 | B1 | 8/2015 | Curtis | |
| 2003/0032476 | A1* | 2/2003 | Walker | G06Q 20/00 463/25 |
| 2005/0216338 | A1 | 9/2005 | Tseng et al. | 705/14 |
| 2006/0073884 | A1 | 4/2006 | Walker et al. | 463/25 |
| 2006/0178968 | A1* | 8/2006 | Jung | G06Q 20/06 705/35 |
| 2007/0072676 | A1* | 3/2007 | Baluja | G06Q 30/02 463/42 |
| 2007/0112624 | A1* | 5/2007 | Jung | G06Q 30/02 705/14.36 |
| 2007/0118420 | A1* | 5/2007 | Jung | G06Q 20/06 705/14.12 |
| 2007/0203828 | A1* | 8/2007 | Jung | G06Q 90/00 705/38 |
| 2007/0265091 | A1* | 11/2007 | Aguilar, Jr. | G07F 17/32 463/42 |
| 2008/0009340 | A1 | 1/2008 | Walker et al. | 463/25 |
| 2008/0009341 | A1 | 1/2008 | Walker et al. | 463/25 |
| 2008/0091517 | A1 | 4/2008 | Koonce et al. | 705/10 |
| 2008/0204448 | A1* | 8/2008 | Dawson | G06Q 30/02 345/419 |
| 2008/0228598 | A1 | 9/2008 | Leff et al. | 705/27 |
| 2009/0124349 | A1* | 5/2009 | Dawson | A63F 13/12 463/24 |
| 2009/0149260 | A1* | 6/2009 | Mori | A63F 13/12 463/42 |
| 2009/0170608 | A1* | 7/2009 | Herrmann | G06Q 30/02 463/42 |
| 2009/0204907 | A1 | 8/2009 | Finn et al. | 715/757 |
| 2009/0222348 | A1 | 9/2009 | Ransom et al. | 705/14 |
| 2009/0248635 | A1 | 10/2009 | Gross | 707/3 |
| 2010/0121808 | A1* | 5/2010 | Kuhn | G06N 99/005 706/50 |
| 2010/0131355 | A1 | 5/2010 | Kitchen et al. | 705/14.43 |
| 2010/0145797 | A1* | 6/2010 | Hamilton, II | G06Q 30/0251 705/14.49 |
| 2010/0198653 | A1* | 8/2010 | Bromenshenkel | G06Q 30/06 705/7.11 |
| 2010/0228617 | A1 | 9/2010 | Ransom et al. | 705/14.25 |
| 2011/0029364 | A1 | 2/2011 | Roeding et al. | 705/14.16 |
| 2011/0065490 | A1 | 3/2011 | Lutnick | 463/16 |
| 2011/0082772 | A1 | 4/2011 | Hirson | 705/27.1 |
| 2011/0106607 | A1 | 5/2011 | Alfonso | |
| 2011/0112895 | A1 | 5/2011 | Snyder | 705/14.12 |
| 2011/0153428 | A1 | 6/2011 | Ramer et al. | 705/14.64 |
| 2011/0153734 | A1* | 6/2011 | Kawakami | A63F 13/12 709/203 |
| 2011/0161159 | A1 | 6/2011 | Tekiela et al. | 705/14.41 |
| 2011/0300923 | A1* | 12/2011 | Van Luchene | A63F 13/10 463/25 |
| 2012/0011002 | A1 | 1/2012 | Crowe et al. | 705/14.66 |
| 2012/0047017 | A1* | 2/2012 | Hernandez | G06Q 30/0241 705/14.55 |
| 2012/0084669 | A1* | 4/2012 | Flint | G06Q 10/10 715/753 |
| 2012/0101886 | A1* | 4/2012 | Subramanian | G06Q 30/0611 705/14.23 |
| 2012/0109785 | A1 | 5/2012 | Karlsson | 705/27.1 |
| 2012/0238353 | A1* | 9/2012 | Herrmann | G06Q 30/02 463/25 |
| 2012/0289346 | A1* | 11/2012 | Van Luchene | A63F 13/10 463/42 |
| 2013/0005465 | A1* | 1/2013 | Murphy | A63F 13/335 463/35 |
| 2013/0079144 | A1* | 3/2013 | Ahmed | A63F 13/87 463/42 |
| 2013/0179913 | A1* | 7/2013 | Haberman | H04N 21/2668 725/14 |
| 2013/0331179 | A1 | 12/2013 | Taylor et al. | 463/29 |

OTHER PUBLICATIONS

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshot access date May 24, 2012 2:19 PM, 1 page.

"Behavioural Analytics & Campaigning", http://lotaris.com/behavioural_analytics_and_Compaigning.htm, screenshot access date May 24, 2012 2:21 PM, 1 page.

* cited by examiner

DYNAMICALLY PROVIDING SYSTEM COMMUNICATIONS IN A VIRTUAL SPACE TAILORED TO INDIVIDUAL USERS RESPONSIVE TO SPECIFIC USER ACTIONS AND INDIVIDUAL CURRENT STATES

CROSS REFERENCE TO RELATED APPLICATIONS

The present application is a continuation of U.S. Pat. No. 8,880,629, filed Jun. 18, 2012, entitled "Dynamically Providing System Communications Tailored to Individual Users Responsive to Trigger Events in Virtual Spaces," the disclosure of which is incorporated herein by reference in its entirety.

FIELD OF THE DISCLOSURE

This disclosure relates to dynamically providing system communications tailored to individual users responsive to trigger events in virtual spaces.

BACKGROUND

In-space communications (e.g., offers and messages) in network-based games are known. In existing systems, however, such communications are typically hard coded or "baked" into the games. Thus, any changes or additions to the communications may need to be programmed and deployed into the live games in order for those changes or additions to be realized. Not only can this be a time intensive workflow, but it may also discourage using user data to customize communications.

SUMMARY

One aspect of the disclosure relates to a system configured to dynamically provide system communications tailored to individual users responsive to trigger events in a virtual space, in accordance with one or more implementations. A given system communication may include one or more of a third-party advertisement, an offer for in-space products, an offer in-space services, an informative message, and/or other system communications. The dynamic nature of some implementations may greatly alleviate a need for engineering, art, and/or other resources to provide system communications. In exemplary implementations, system communications may be fined tuned to a user's current status in a virtual space, which may increase rates of return or a likelihood of desired user reactions to system communications. Additionally, with the flexibility to present vastly more and different system communications, more system communications may be tested to further improve their desired outcomes. For example, NB testing may be performed across various subsets of users. In some implementations, the system may include one or more servers. The server(s) may be configured to communicate with one or more client computing platforms according to a client/server architecture. The users may access the system and/or the virtual space via the client computing platform(s).

The server(s) may be configured to execute one or more computer program modules. The computer program modules may include one or more of a user module, a space module, a user-action monitoring module, a current-state information module, a system-communication matching module, a system-communication provisioning module, an admin module, and/or other modules. The user module may be configured to access and/or manage one or more user profiles and/or user information associated with users of the system. The space module may be configured to implement an instance of the virtual space executed by the computer modules to determine views of the virtual space.

The user-action monitoring module may be configured to monitor actions performed by a user within the virtual space for trigger events. Generally speaking, a given trigger event may be a specific user action that has been defined as a trigger event. That is, any action that can be performed by a user in the virtual space may be defined as a trigger event. By way of non-limiting example, a user action may include one or more of registering as a user of the virtual space, logging into the virtual space, controlling a setting in a virtual space, establishing a relationship with another user and/or user character in the virtual space, managing virtual goods, customizing a user character, initiating and/or engaging in gameplay within the virtual space, controlling a user character during gameplay, providing a user selection during gameplay, and/or other user actions in the virtual space. In sum, any action performed by a user in association with the virtual space may be considered a user action. In some implementations, results and/or consequences of user actions may be defined as trigger events. Examples of results and/or consequences of user actions may include one or more of an outcome of gameplay, an accumulation of one or more virtual goods, a reply to a relationship request, and/or other results and/or consequences of user actions.

The current-state information module may be configured to obtain current states responsive to trigger events occurring within the virtual space. A given current state may include one or more of (1) information associated with the virtual space at a given moment, (2) information associated with a user character at a given moment, (3) information associated with a user at a given moment, and/or other information. The given moment may be approximately the time when a corresponding trigger event occurred in the virtual space. Information associated with the virtual space may include one or more of a game score, a progress level, a specific virtual space instance name or other identifier, the amount of time that the virtual space has been open for play, and/or other information associated with the virtual space. Information associated with a user character may include one or more of a status with the virtual space, a capability of a user character within the virtual space, one or more relationships of a user character, a faction and/or other affiliation of the user character, virtual items acquired and/or used by the user character, and/or other information associated with a user character. Information associated with a user may include one or more of information associated with a user profile, total time spent engaged in the virtual space, time spent in the virtual space during a current session, a frequency of engagement in the virtual space, relationships of a user within the virtual space, a geo-location of the user, an amount of real-world money the user has spent toward the virtual space, a social networking platform from which the user is accessing the virtual space, an identification of a server or server cluster providing the virtual space, virtual items in an inventory of the user, spoken language of the user, an amount of time since the user joined the virtual space, and/or other information associated with a user.

The system-communication matching module may be configured to determine whether individual current states correspond to one or more of a plurality of system communications. A given system communication may be a communication configured to be provided by the system for presentation to users via one or more communication channels. System communications may be stored by the server(s) and/or at other locations in the system. By way of non-limiting example, a given system communication may include one or more of a third-party advertisement, an offer for in-space products, an offer in-space services, an informative message, system communication associated with a geo-location of the user, a custom message created for the user, a custom sales event created for the user, a communication external to the system (e.g., an email) created for the user, and/or other system communications. The one or more communication channels may include one or more of an in-space modal, an in-space message, an out-of-space email, and/or other communication channels, as described further herein.

According to some implementations, the system-communication matching module may be configured to determine whether an individual current state corresponds to one or more system communications based on one or more space-state criteria, user attribute criteria, and/or other criteria. Examples of space-state criteria may include one or more of a game score breaching a threshold, a progress level breaching a threshold, and/or other space-state criteria. Examples of user attribute criteria may include one or more of information associated with a user profile meeting a condition, total time spent engaged in the virtual space breaching a threshold, time spent in the virtual space during a current session breaching a threshold, a frequency of engagement in the virtual space breaching a threshold, an amount of real-world money the user has spent toward the virtual space, a unique user identifier being a specific number type or within a specific range of user identifiers, and/or other user attribute criteria.

In some implementations, the current-state information module may be configured to add individual current states to a state queue containing one or more current states to be matched to system communications, as described in connection with the system-communication matching module. The state queue may be stored by the server(s) and/or at other locations in the system. The system-communication matching module may be configured to remove a given current state from the state queue responsive to the given current state being determined to correspond with a given system communication.

The system-communication provisioning module may be configured to provide system communications for presentation to users via one or more communication channels. The system-communication provisioning module may be configured to provide a given system communication in real time, near-real time, at a later time, and/or at another time relative to a corresponding trigger event. As mentioned above, the one or more communication channels may include one or more of an in-space modal, an in-space message, an out-of-space email, and/or other communication channels. According to some implementations, an in-space modal may include a child window that requires a user to interact with it before returning to operating the corresponding parent window or application. An in-space modal may be referred to as a modal window, a heavy window, a modal dialog, and/or other related terms. An in-space message may include a textual message and/or other message that is accessible within the virtual space. An out-of-space email may describe an email sent to an email account associated with a user of the virtual space. Such an email account may be provided by the same provider as the virtual space or by a third party.

The admin module may be configured to receive information associated with dynamically providing system communications tailored to individual users responsive to trigger events in the virtual space. In some implementations, such information may include one or more of new system communications, modifications to existing system communications, information defining specific user actions and/or other virtual space events as trigger events, information associated with one or more bases for determining whether an individual current state corresponds to one or more system communications, and/or information associated with dynamically providing system communications tailored to individual users responsive to trigger events in the virtual space.

The admin module may be configured to control dynamically providing system communications two or more different virtual spaces. Such control may be agnostic to the particular virtual space. That is, trigger events may be defined generically so as to be applicable to various virtual spaces. In some implementations, the admin module may be configured to generate templates for dynamically providing system communications, which may be applied to two or more different virtual spaces.

The admin module may be configured to determine user responsiveness to system communications presented via the one or more communication channels. Determining user responsiveness may include determining one or more of whether a given system communication was opened or otherwise interacted with by a user, whether a user performed a specific action in response to a given system communication, and/or other user responses.

In some implementations, admin module may be configured to provide an admin interface for presentation to an administrative user. The admin interface may be configured to receive information from and/or provide information to the administrative user. Exemplary implementations of an admin interface are described herein.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
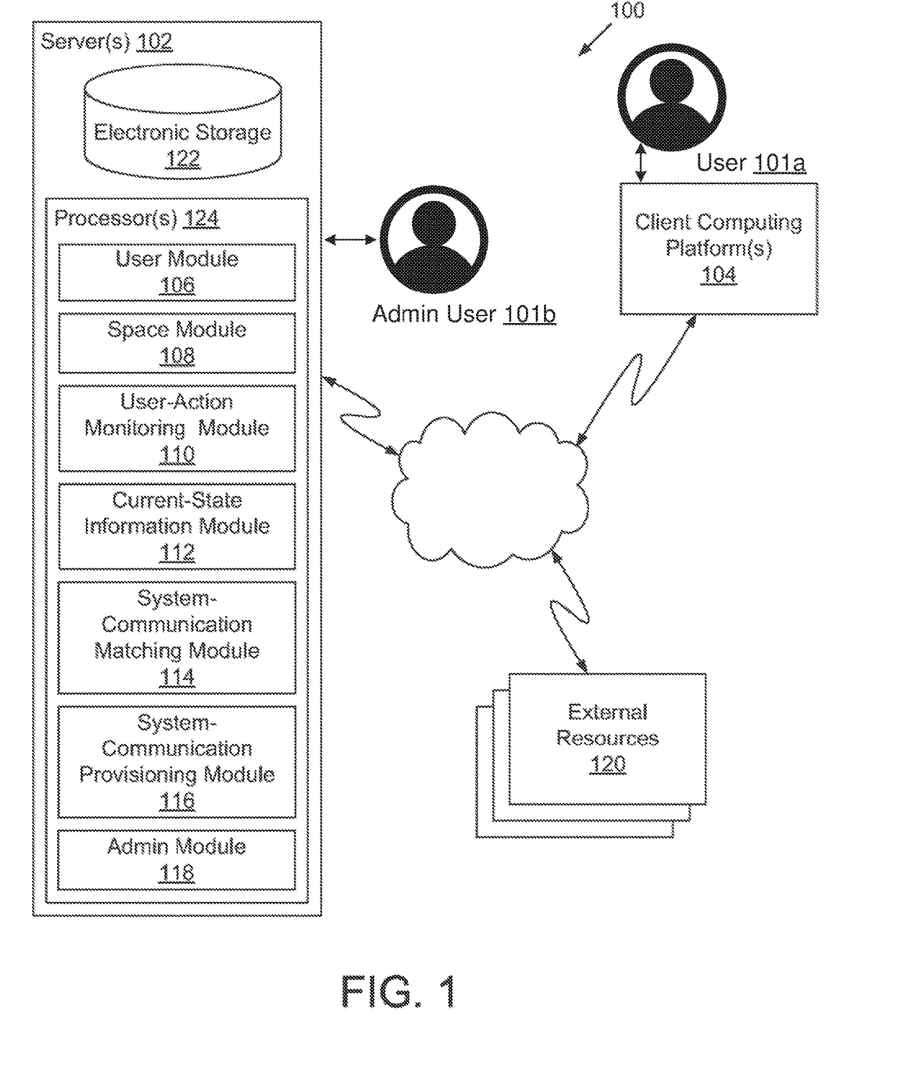
FIG. 1 illustrates a system configured to dynamically provide system communications tailored to individual users responsive to trigger events in a virtual space, in accordance with one or more implementations.

FIG. 1 illustrates a system 100 configured to dynamically provide system communications tailored to individual users responsive to trigger events in a virtual space, in accordance with one or more implementations. A given system communication may include one or more of a third-party advertisement, an offer for in-space products, an offer in-space services, an informative message, and/or other system communications. The dynamic nature of some implementations may greatly alleviate a need for engineering, art, and/or other resources to provide system communications. In exemplary implementations, system communications may be fined tuned to a user's current status in a virtual space, which may increase rates of return or a likelihood of desired user reactions to system communications. Additionally, with the flexibility to present vastly more and different system communications, more system communications may be tested to further improve their desired outcomes. For example, NB testing may be performed across various subsets of users. In some implementations, system 100 may include one or more servers 102. The server(s) 102 may be configured to communicate with one or more client computing platforms 104 according to a client/server architecture. The users may access system 100 and/or the virtual space via client computing platform(s) 104.

The server(s) 102 may be configured to execute one or more computer program modules. The computer program modules may include one or more of a user module 106, a space module 108, a user-action monitoring module 110, a current-state information module 112, a system-communication matching module 114, a system-communication provisioning module 116, an admin module 118, and/or other modules.

The user module 106 may be configured to access and/or manage one or more user profiles and/or user information associated with users of system 100. The one or more user profiles and/or user information may include information stored by server(s) 102, one or more of the client computing platform(s) 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The views may then be communicated (e.g., via streaming, via object/position data, and/or other information) from server(s) 102 to client computing platform(s) 104 for presentation to users. The view determined and transmitted to a given client computing platform 104 may correspond to a user character being controlled by a user 101a (interchangeably referred to herein as user) via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s)

104. Communications may be routed to and from the appropriate users through server(s) 102 (e.g., through space module 108).

The user-action monitoring module 110 may be configured to monitor actions performed by a user within the virtual space for trigger events. Generally speaking, a given trigger event may be a specific user action that has been defined as a trigger event. That is, any action that can be performed by a user in the virtual space may be defined as a trigger event. By way of non-limiting example, a user action may include one or more of registering as a user of the virtual space, logging into the virtual space, controlling a setting in a virtual space, establishing a relationship with another user and/or user character in the virtual space, managing virtual goods, customizing a user character, initiating and/or engaging in gameplay within the virtual space, controlling a user character during gameplay, providing a user selection during gameplay, and/or other user actions in the virtual space. In sum, any action performed by a user in association with the virtual space may be considered a user action. In some implementations, results and/or consequences of user actions may be defined as trigger events. Examples of results and/or consequences of user actions may include one or more of an outcome of gameplay, an accumulation of one or more virtual goods, a reply to a relationship request, and/or other results and/or consequences of user actions.

The current-state information module 112 may be configured to obtain current states responsive to trigger events occurring within the virtual space. A given current state may include one or more of (1) information associated with the virtual space at a given moment, (2) information associated with a user character at a given moment, (3) information associated with a user at a given moment, and/or other information. The given moment may be approximately the time when a corresponding trigger event occurred in the virtual space. Information associated with the virtual space may include one or more of a game score, a progress level, a specific virtual space instance name or other identifier, the amount of time that the virtual space has been open for play, and/or other information associated with the virtual space. Information associated with a user character may include one or more of a status with the virtual space, a capability of a user character within the virtual space, one or more relationships of a user character, a faction and/or other affiliation of the user character, virtual items acquired and/or used by the user character, and/or other information associated with a user character. Information associated with a user may include one or more of information associated with a user profile, total time spent engaged in the virtual space, time spent in the virtual space during a current session, a frequency of engagement in the virtual space, relationships of a user within the virtual space, a geo-location of the user, an amount of real-world money the user has spent toward the virtual space, a social networking platform from which the user is accessing the virtual space, an identification of a server or server cluster providing the virtual space, virtual items in an inventory of the user, spoken language of the user, an amount of time since the user joined the virtual space, and/or other information associated with a user.

The system-communication matching module 114 may be configured to determine whether individual current states correspond to one or more of a plurality of system communications. A given system communication may be a communication configured to be provided by the system for presentation to users via one or more communication channels. System communications may be stored by server(s) 102 and/or at other locations in system 100. By way of non-limiting example, a given system communication may include one or more of a third-party advertisement, an offer for in-space products, an offer in-space services, an informative message, system communication associated with a geo-location of the user, a custom message created for the user, a custom sales event created for the user, a communication external to system 100 (e.g., an email) created for the user, and/or other system communications. The one or more communication channels may include one or more of an in-space modal, an in-space message, an out-of-space email, and/or other communication channels, as described further herein.

According to some implementations, system-communication matching module 114 may be configured to determine whether an individual current state corresponds to one or more system communications based on one or more space-state criteria, user attribute criteria, and/or other criteria. Examples of space-state criteria may include one or more of a game score breaching a threshold, a progress level breaching a threshold, and/or other space-state criteria. Examples of user attribute criteria may include one or more of information associated with a user profile meeting a condition, total time spent engaged in the virtual space breaching a threshold, time spent in the virtual space during a current session breaching a threshold, a frequency of engagement in the virtual space breaching a threshold, an amount of real-world money the user has spent toward the virtual space, a unique user identifier being a specific number type or within a specific range of user identifiers, and/or other user attribute criteria.

Figure 4:
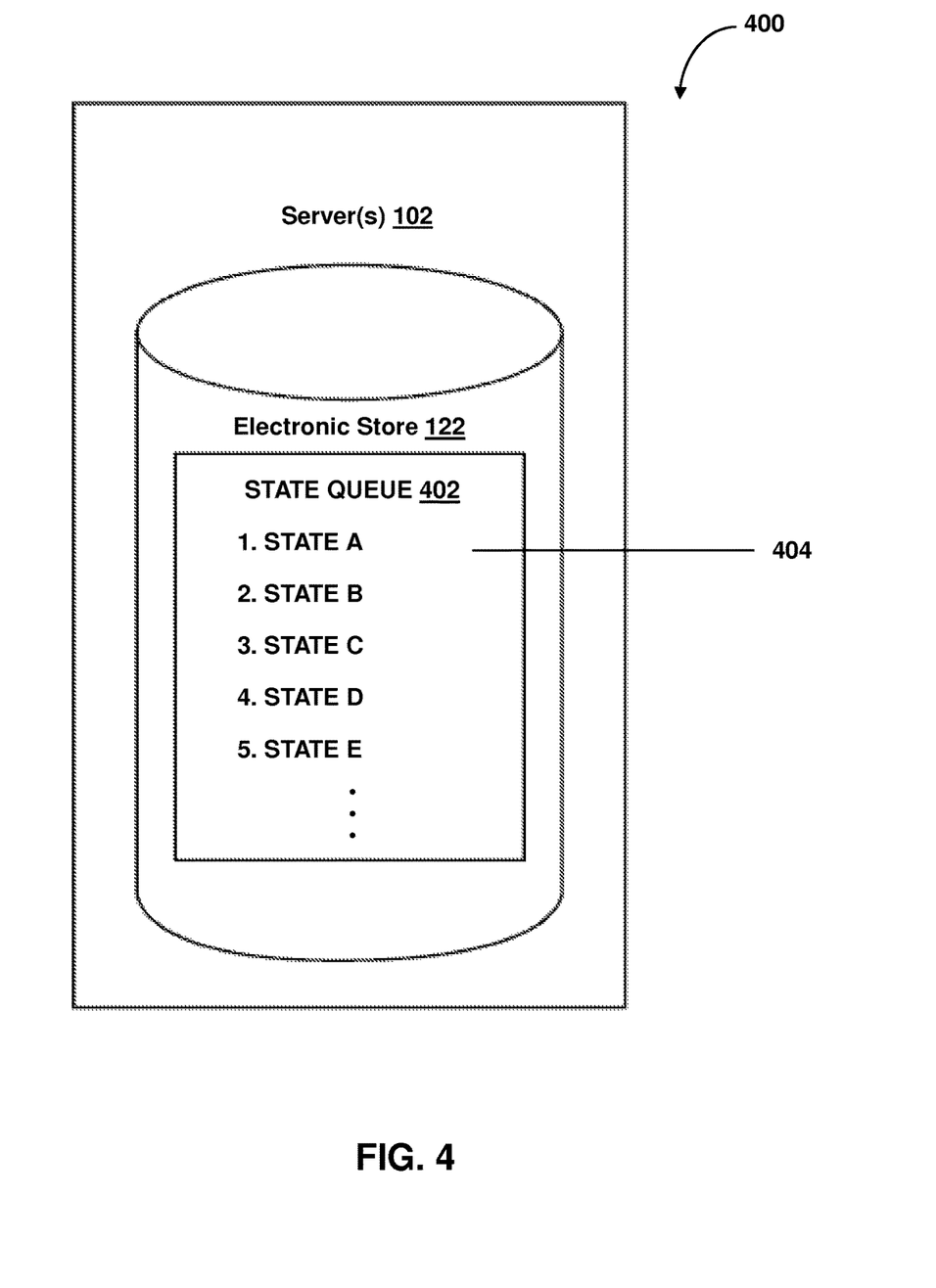
FIG. 4 is an illustrative representation of a state queue, in accordance with one or more implementations.

With reference to FIG. 4, in some implementations, current-state information module 112 may be configured to add individual current states 404 to a state queue 402 containing one or more current states to be matched to system communications, as described in connection with system-communication matching module 114. The state queue 402 may be stored by server(s) 102 and/or at other locations in system 100. The system-communication matching module 114 may be configured to remove a given current state 404 from the state queue 402 responsive to the given current state 404 being determined to correspond with a given system communication.

The system-communication provisioning module 116 may be configured to provide system communications for presentation to users via one or more communication channels. The system-communication provisioning module 116 may be configured to provide a given system communication in real time, near-real time, at a later time, and/or at another time relative to a corresponding trigger event. As mentioned above, the one or more communication channels may include one or more of an in-space modal, an in-space message, an out-of-space email, and/or other communication channels. According to some implementations, an in-space modal may include a child window that requires a user to interact with it before returning to operating the corresponding parent window or application. An in-space modal may be referred to as a modal window, a heavy window, a modal dialog, and/or other related terms. An in-space message may include a textual message and/or other message that is accessible within the virtual space. An out-of-space email may describe an email sent to an email account associated with a user of the virtual space. Such an email account may be provided by the same provider as the virtual space or by a third party.

The admin module 118 may be configured to receive information associated with dynamically providing system communications tailored to individual users responsive to trigger events in the virtual space. In some implementations, such information may include one or more of new system communications, modifications to existing system communications, information defining specific user actions and/or other virtual space events as trigger events, information associated with one or more bases for determining whether an individual current state corresponds to one or more system communications, and/or information associated with dynamically providing system communications tailored to individual users responsive to trigger events in the virtual space.

The admin module 118 may be configured to control dynamically providing system communications two or more different virtual spaces. Such control may be agnostic to the particular virtual space. That is, trigger events may be defined generically so as to be applicable to various virtual spaces. In some implementations, admin module 118 may be configured to generate templates for dynamically providing system communications, which may be applied to two or more different virtual spaces.

The admin module 118 may be configured to determine user responsiveness to system communications presented via the one or more communication channels. Determining user responsiveness may include determining one or more of whether a given system communication was opened or otherwise interacted with by a user, whether a user performed a specific action in response to a given system communication, and/or other user responses.

In some implementations, admin module 118 may be configured to provide an admin interface for presentation to an administrative user 101*b* (interchangeably referred to herein as administrative user). The admin interface may be configured to receive information from and/or provide information to the administrative user. Exemplary implementations of an admin interface are described in connection with FIG. 2.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The server(s) 102 may include electronic storage 122, one or more processors 124, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute modules 106, 108, 110, 112, 114, 116, 118, and/or other modules. The processor(s) 124 may be configured to execute modules 106, 108, 110, 112, 114, 116, 118, and/or other modules by software; hardware; firmware; some combination of software, hardware, and/or firmware; and/or other mechanisms for configuring processing capabilities on processor(s) 124.

It should be appreciated that although modules 106, 108, 110, 112, 114, 116, and 118 are illustrated in FIG. 1 as being co-located within a single processing unit, in implementations in which processor(s) 124 includes multiple processing units, one or more of modules 106, 108, 110, 112, 114, 116, and/or 118 may be located remotely from the other modules. The description of the functionality provided by the different modules 106, 108, 110, 112, 114, 116, and/or 118 described below is for illustrative purposes, and is not intended to be limiting, as any of modules 106, 108, 110, 112, 114, 116, and/or 118 may provide more or less functionality than is described. For example, one or more of modules 106, 108, 110, 112, 114, 116, and/or 118 may be eliminated, and some or all of its functionality may be provided by other ones of modules 106, 108, 110, 112, 114, 116, and/or 118. As another example, processor(s) 124 may be configured to execute one or more additional modules that may perform some or all of the functionality attributed below to one of modules 106, 108, 110, 112, 114, 116, and/or 118.

Figure 2:
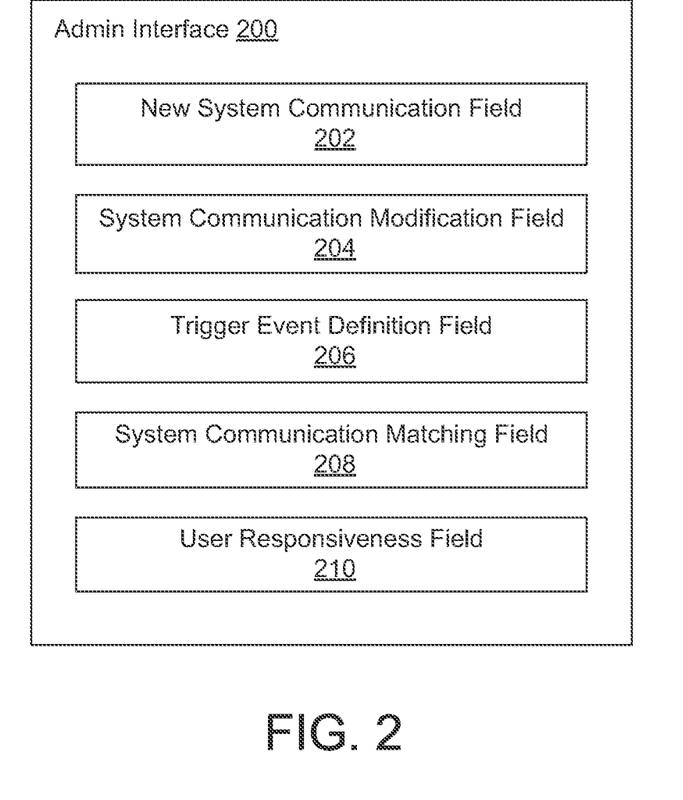
FIG. 2 illustrates an admin interface, in accordance with one or more implementations.

FIG. 2 illustrates an admin interface 200, in accordance with one or more implementations. The admin interface 200 may be provided by an admin module that is the same as or similar to admin module 118. The admin interface 200 may be presented by a client computing platform(s) 104 and/or other computing platform. As depicted in FIG. 2, admin interface 200 may include one or more of a new system communications field 202, a system communication modification field 204, a trigger event definition field 206, a system communication matching field 208, a user responsiveness field 210, and/or other fields. The depiction of admin interface 200 in FIG. 2 is not intended to be limiting as one or more of fields 202, 204, 206, 208, and/or 210 may be combined with another field and/or omitted from admin interface 200. One or more of fields 202, 204, 206, 208, and/or 210 may operate in conjunction with one or more of modules 106, 108, 110, 112, 114, 116, and/or 118.

The new system communications field 202 may be configured to receive one or more new system communications. The system communication modification field 204 may be configured to facilitate modifying existing system communications. The trigger event definition field 206 may be configured to receive information defining specific user actions and/or other virtual space events as trigger events. The system communication matching field 208 may be configured to receive information associated with one or more bases for determining whether an individual current state corresponds to one or more system communications. The user responsiveness field 210 may be configured to facilitate determining user responsiveness to system communications presented via the one or more communication channels.

Figure 3:
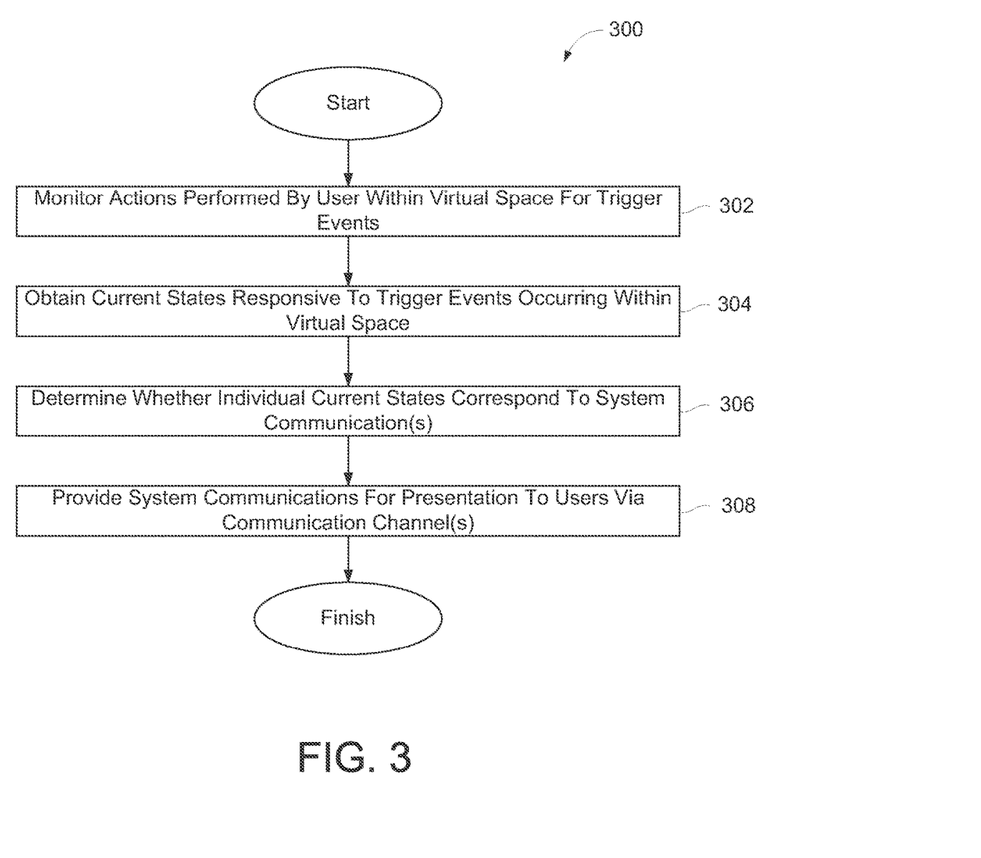
FIG. 3 illustrates a method for dynamically providing system communications tailored to individual users responsive to trigger events in a virtual space, in accordance with one or more implementations.

FIG. 3 illustrates a method 300 for dynamically providing system communications tailored to individual users responsive to trigger events in a virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, actions performed by a user within the virtual space may be monitored for trigger events. Operation 302 may be performed by a user-action monitoring module that is the same as or similar to user-action monitoring module 110, in accordance with one or more implementations.

At an operation 304, current states may be obtained responsive to trigger events occurring within the virtual space. Operation 304 may be performed by a current-state information module that is the same as or similar to current-state information module 112, in accordance with one or more implementations.

At an operation 306, a determination may be made as to whether individual current states correspond to one or more of a plurality of system communications. Operation 306 may be performed by a system-communication matching module that is the same as or similar to system-communication matching module 114, in accordance with one or more implementations.

At an operation 308, system communications may be provided for presentation to users via one or more communication channels. Operation 308 may be performed by a system-communication provisioning module that is the same as or similar to system-communication provisioning module 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to dynamically provide system communications tailored to individual users responsive to occurrences of trigger events in a virtual space, the system comprising:
one or more processors configured by machine-readable instructions to:
execute an instance of the virtual space, wherein the instance is configured to facilitate interaction between the individual users and with the virtual space, wherein the individual users are associated with individual client computing platforms through which command inputs are provided by the individual users that exercise control by the individual users within the virtual space;
provide an admin interface for presentation to an administrative user of the virtual space for managing system communications of the virtual space, the admin interface being configured to receive information from the administrative user, the information including one or more of new system communications, existing system communications, trigger event definitions, and/or information associated with one or more bases for determining whether an individual current state corresponds to one or more system communications;
monitor actions performed by a user within the virtual space for trigger events including a first trigger event, the first trigger event being a specific user action performed by a first user that has been defined as a trigger event, wherein the specific user action is one or more of registering as a user in the virtual space, establishing a relationship with another user and/or user character in the virtual space, customizing a user character, and/or engaging in gameplay within the virtual space;

obtain current states responsive to trigger events occurring within the virtual space, the current states being separate and discrete from the trigger events, a given current state for the first user including information indicating one or more of:
  (a) a frequency of engagement by the first user in the virtual space,
  (b) an amount of real-world money the first user has spent toward the virtual space, and/or
  (c) total time spent by the first user while engaged in gameplay in the virtual space, wherein a first current state is obtained responsive to the first trigger event;

further responsive to trigger events occurring within the virtual space,
  (i) determine whether individual current states correspond to one or more of a plurality of system communications, a given system communication being a communication configured to be provided by the system for presentation to users via one or more communication channels,
  (ii) determine whether a first system communication corresponds to the first current state, and
  (iii) select the first system communication responsive to the first system communication being determined to correspond to the first current state, such selection being further responsive to occurrence of the first trigger event; and provide system communications for presentation to users via the one or more communication channels, the first system communication being presented to the first user, wherein the admin interface includes user responsiveness information indicating user responsiveness to the system communications presented via the one or more communication channels.

2. The system of claim 1, wherein the one or more processors are further configured by machine-readable instructions to add the first current state to a state queue containing one or more current states to be matched to system communications.

3. The system of claim 2, wherein the one or more processors are further configured by machine-readable instructions to remove the first current state from the state queue responsive to the first current state being determined to correspond with the first system communication.

4. The system of claim 1, wherein the one or more processors are further configured by machine-readable instructions to determine whether current states correspond to one or more of a plurality of system communications based on one or more space-state criteria.

5. The system of claim 1, wherein the one or more processors are further configured by machine-readable instructions to determine whether current states correspond to one or more of a plurality of system communications based on one or more user attribute criteria.

6. The system of claim 1, wherein the one or more communication channels includes one or more of an in-space modal, an in-space message, and/or an out-of-space email.

7. The system of claim 1, wherein a given system communication includes one or more of a third-party advertisement, an offer for in-space products, an offer in-space services, and/or an informative message.

8. The system of claim 1, wherein the one or more processors are further configured by machine-readable instructions to determine user responsiveness to system communications presented via the one or more communication channels.

9. A method for dynamically providing system communications tailored to individual users responsive to occurrences of trigger events in a virtual space, the method being implemented in a computer system comprising one or more processors configured by machine-readable instructions, the method comprising:

executing an instance of the virtual space, wherein the instance is configured to facilitate interaction between the individual users and with the virtual space, wherein the individual users are associated with individual client computing platforms through which command inputs are provided by the individual users that exercise control by the individual users within the virtual space;

providing an admin interface for presentation to an administrative user of the virtual space for managing system communications of the virtual space, the admin interface being configured to receive information from the administrative user, the information including one or more of new system communications, existing system communications, trigger event definitions, and/or information associated with one or more bases for determining whether an individual current state corresponds to one or more system communications;

monitoring actions performed by a user within the virtual space for trigger events including a first trigger event, the first trigger event being a specific user action performed by a first user that has been defined as a trigger event, wherein the specific user action is one or more of registering as a user in the virtual space, establishing a relationship with another user and/or user character in the virtual space, customizing a user character, and/or engaging in gameplay within the virtual space;

obtaining current states responsive to trigger events occurring within the virtual space, the current states being separate and discrete from the trigger events, a given current state for the first user including information indicating one or more of:
  (a) a frequency of engagement by the first user in the virtual space,
  (b) an amount of real-world money the first user has spent toward the virtual space, and/or
  (c) total time spent by the first user while engaged in gameplay in the virtual space, wherein a first current state is obtained responsive to the first trigger event;

further responsive to trigger events occurring within the virtual space,
  (i) determining whether individual current states correspond to one or more of a plurality of system communications, a given system communication being a communication configured to be provided by a system for presentation to users via one or more communication channels,
  (ii) determine whether a first system communication corresponds to the first current state, and
  (iii) select the first system communication responsive to the first system communication being determined to correspond to the first current state, such selection being further responsive to occurrence of the first trigger event; and providing system communications for presentation to users via the one or more communication channels, the first system communication being presented to the first user;

wherein the admin interface includes user responsiveness information indicating user responsiveness to the system communications presented via the one or more communication channels.

10. The method of claim 9, further comprising adding the first current state to a state queue containing one or more current states to be matched to system communications.

11. The method of claim 10, further comprising removing the first current state from the state queue responsive to the first current state being determined to correspond with the first system communication.

12. The method of claim 9, wherein determining whether current states correspond to one or more of a plurality of system communications is based on one or more space-state criteria.

13. The method of claim 9, wherein determining whether current states correspond to one or more of a plurality of system communications is based on one or more user attribute criteria.

14. The method of claim 9, wherein the one or more communication channels includes one or more of an in-space modal, an in-space message, and/or an out-of-space email.

15. The method of claim 9, wherein a given system communication includes one or more of a third-party advertisement, an offer for in-space products, an offer in-space services, and/or an informative message.

16. The method of claim 9, further comprising determining user responsiveness to system communications presented via the one or more communication channels.

* * * * *